(12) United States Patent
Magnone et al.

(10) Patent No.: US 9,562,641 B2
(45) Date of Patent: Feb. 7, 2017

(54) QUICK-CONNECT SYSTEM FOR CONNECTING A TUBE TO A RECEIVING BODY, IN PARTICULAR FOR USE IN WALL-MOUNTED BOILERS AND THE LIKE

(75) Inventors: Luca Magnone, Pino Torinese (IT); Angelo Spisso, Pianezza (IT)

(73) Assignee: ELBI INTERNATIONAL S.P.A., Turin (IT)

( * ) Notice: Subject to any disclaimer, the term of this patent is extended or adjusted under 35 U.S.C. 154(b) by 319 days.

(21) Appl. No.: 14/234,179

(22) PCT Filed: Jul. 23, 2012

(86) PCT No.: PCT/IB2012/053742
§ 371 (c)(1),
(2), (4) Date: Jan. 22, 2014

(87) PCT Pub. No.: WO2013/014599
PCT Pub. Date: Jan. 31, 2013

(65) Prior Publication Data
US 2014/0167412 A1    Jun. 19, 2014

(30) Foreign Application Priority Data

Jul. 25, 2011  (IT) .............................. TO2011A0668

(51) Int. Cl.
*F16L 37/256* (2006.01)
*F16L 37/113* (2006.01)

(52) U.S. Cl.
CPC ............ *F16L 37/256* (2013.01); *F16L 37/113* (2013.01)

(58) Field of Classification Search
CPC .............................. F16L 37/256; F16L 37/113
(Continued)

(56) References Cited

U.S. PATENT DOCUMENTS

| 211,164 A | * | 1/1879 | Klein | .................... F16L 37/252 |
| | | | | 285/401 |
| 348,059 A | * | 8/1886 | Schroder | ............... F16L 37/252 |
| | | | | 285/360 |

(Continued)

FOREIGN PATENT DOCUMENTS

| BE | 496066 A | 9/1950 |
| DE | 85 19 900 U1 | 8/1985 |

(Continued)

OTHER PUBLICATIONS

International Search Report of PCT/IB2012/053742 dated Feb. 27, 2013.

*Primary Examiner* — Babajide Demuren
(74) *Attorney, Agent, or Firm* — Sughrue Mion, PLLC

(57) ABSTRACT

The system (1) comprises:
  a tubular interface formation (3) fixed or able to be fixed to a receiving body (C) and having a plurality of shaped retaining lugs (4) angularly spaced around its axis (A-A) and protruding axially and radially towards the outside;
  a tubular fastening member (6) in which the tube (2) can be pre-inserted axially and which has a plurality of external peripheral coupling elements (15) angularly spaced around its axis (A-A) and each able to engage with a corresponding retaining lug (4) of the interface formation (3), in a mutually axially retaining relationship. The fastening member (6), with the tube (2) pre-inserted therein, is able to be inserted into the interface formation (3) in a relative coupling position in which the coupling elements (15) of the fastening member (6) angularly alternate with the retaining lugs (4, 5) of the interface formation (3); the fastening member (6) can then be rotated in a predetermined direction (B), around the tube (2) and with respect to (Continued)

the interface formation (3), from the coupling position into a relative locking position, such as to achieve the engagement of each of its coupling elements (15) with a corresponding retaining lug (4, 5) of the interface formation (3).

7 Claims, 8 Drawing Sheets

(58) Field of Classification Search
USPC .............. 285/139.1, 360, 207, 401, 81, 117
See application file for complete search history.

(56) References Cited

U.S. PATENT DOCUMENTS

| | | | | | |
|---|---|---|---|---|---|
| 762,350 | A | * | 6/1904 | Rehnstrom | F16L 19/0225 285/148.19 |
| 894,594 | A | * | 7/1908 | Cani | F16L 19/0225 285/386 |
| 2,165,163 | A | * | 7/1939 | Waters | F16L 37/113 285/361 |
| 3,203,714 | A | * | 8/1965 | Cronk, Jr. | F16L 37/113 285/281 |
| 3,233,927 | A | * | 2/1966 | Dewhirst | F16L 9/18 285/401 |
| 4,261,599 | A | * | 4/1981 | Streed | F16L 37/113 285/362 |
| 4,632,433 | A | * | 12/1986 | Kimura | F16L 37/107 285/281 |
| 5,397,196 | A | * | 3/1995 | Boiret | F16B 21/04 285/360 |
| 6,447,027 | B1 | * | 9/2002 | Lilley | F16L 37/113 285/148.19 |
| 8,857,398 | B2 | * | 10/2014 | Schieszl | F16L 37/113 123/184.21 |
| 2003/0107218 | A1 | * | 6/2003 | Anderson | B60K 15/04 285/360 |
| 2004/0232695 | A1 | * | 11/2004 | Wirth, Jr. | A47L 9/242 285/314 |
| 2007/0257487 | A1 | * | 11/2007 | Jacklich | F01N 13/1805 285/401 |
| 2010/0270795 | A1 | * | 10/2010 | Itou | F16L 19/005 285/401 |

FOREIGN PATENT DOCUMENTS

| | | | | |
|---|---|---|---|---|
| DE | 4110676 A1 | * | 10/1992 | ............ F16L 37/113 |
| DE | 20 2004 019316 U1 | | 4/2005 | |
| DE | EP 2133615 A1 | * | 12/2009 | ....... F02M 35/10144 |
| DE | 102009057867 A1 | * | 6/2011 | ............ F16L 37/113 |
| DE | 102011008084 A1 | * | 7/2012 | ............ F16L 37/113 |
| FR | 1 102 158 A | | 10/1955 | |
| FR | 2 744 514 A1 | | 8/1997 | |
| IT | EP 1783415 A1 | * | 5/2007 | |
| WO | 2007/098959 A1 | | 9/2007 | |
| WO | 2010/025877 A1 | | 3/2010 | |

* cited by examiner

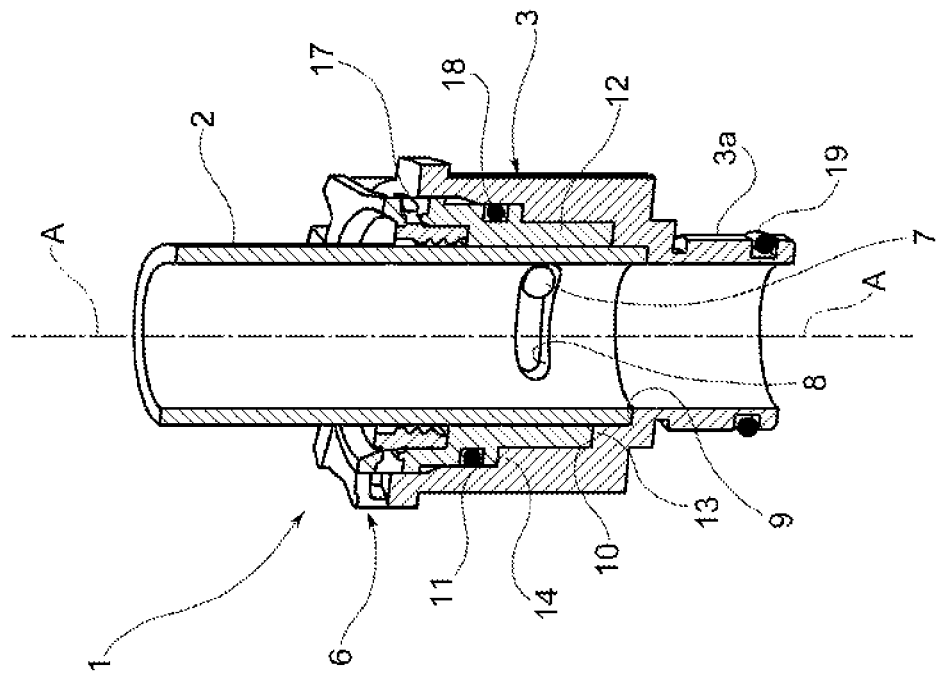
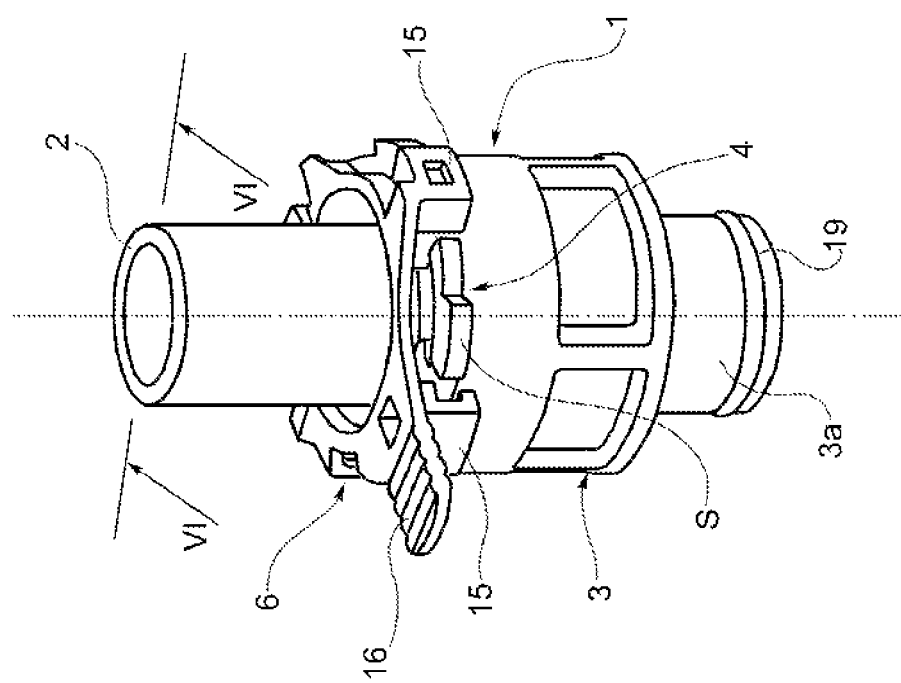
FIG. 6
FIG. 5

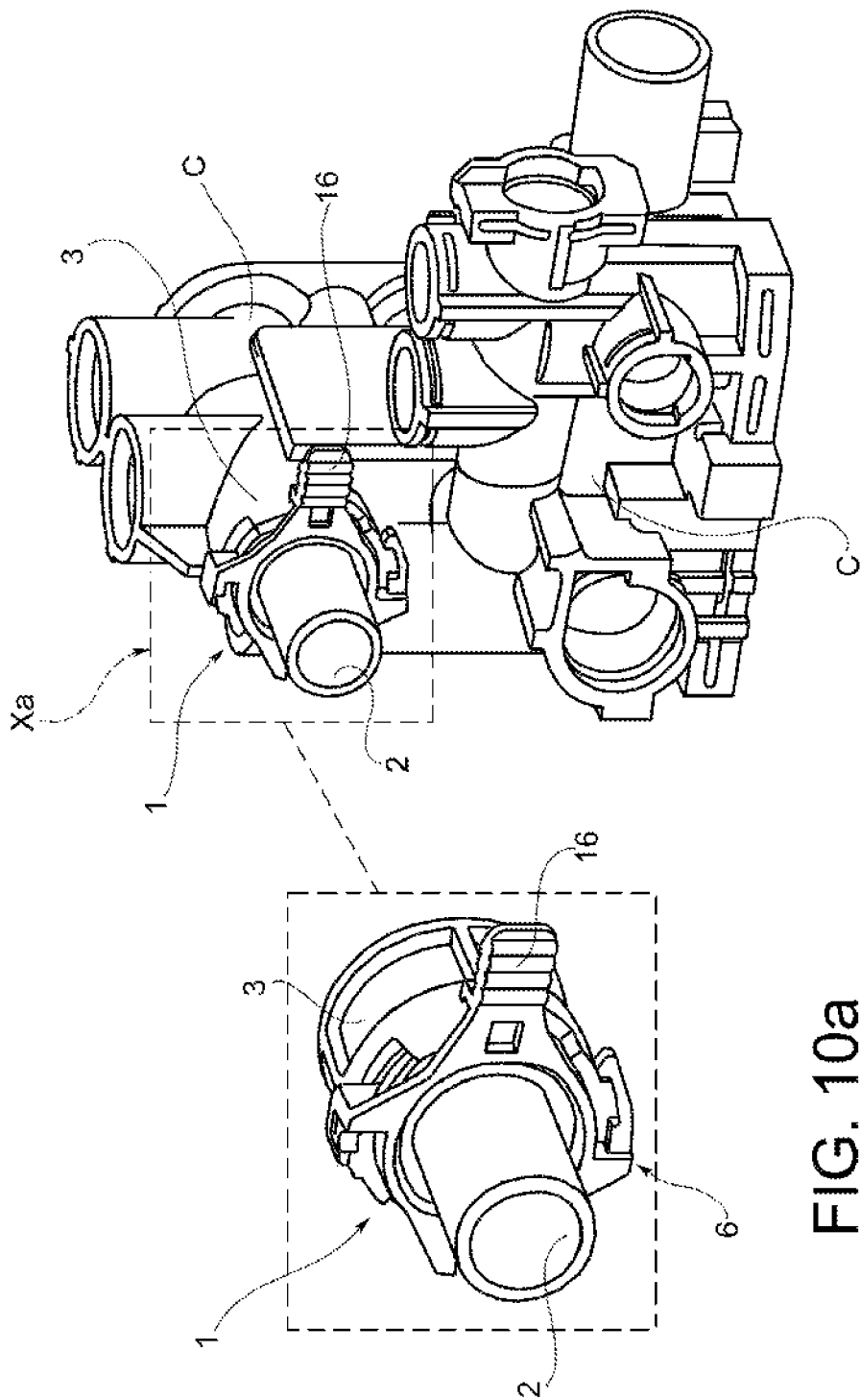

QUICK-CONNECT SYSTEM FOR CONNECTING A TUBE TO A RECEIVING BODY, IN PARTICULAR FOR USE IN WALL-MOUNTED BOILERS AND THE LIKE

CROSS REFERENCE TO RELATED APPLICATIONS

This is a National Stage of International Application No. PCT/IB2012/053742 filed Jul. 23, 2012, claiming priority based on Italian Patent Application No. TO2011A000668 filed Jul. 25, 2011, the contents of all of which are incorporated herein by reference in their entirety.

The present invention relates to a quick-connect system for connecting a tube to a receiving body, in particular for use in wall-mounted boilers and the like.

One object of the invention is to provide an improved quick-connect system.

This object, together with others, is achieved according to the invention by a quick-connect system, comprising:
- a tubular interface formation fixed or able to be fixed to the receiving body and having a plurality of shaped retaining lugs angularly spaced around its axis and protruding axially and radially towards the outside; and
- a fastening member, with a substantially tubular shape, in which the tube can be pre-inserted axially and which has a plurality of external peripheral coupling elements angularly spaced around its axis and each able to engage with a corresponding retaining lug of the interface formation, in a mutually axially retaining relationship;

the system being such that
the fastening member, with the tube pre-inserted therein, is able to be inserted into the interface formation in a relative position in which the coupling elements of the fastening member angularly alternate with the retaining lugs of the interface formation;
the fastening member being then rotatable in a predetermined direction, around the tube and with respect to the interface formation, from the aforementioned relative coupling position into a relative locking position, such as to achieve the engagement of each of its coupling elements with a corresponding retaining lug of the interface formation.

According to a further characteristic feature, the fastening member is internally provided with a positioning projection able to engage in a corresponding eyelet provided in the tube, such that when this projection is engaged in the eyelet of the tube, the latter and the fastening member are substantially locked together in the axial direction, but are capable of performing a relative angular displacement of a predetermined amount about their axis.

Further characteristic features and advantages of the invention will become clear from the following detailed description provided purely by way of a non-limiting example, with reference to the accompanying drawings in which:

FIG. 5 is a perspective view of the quick-connect system shown during a stage of coupling together of the fastening member and the interface formation;

FIG. 6 is a cross-sectional view along the line VI-VI of FIG. 4;

FIG. 10 is a perspective view which shows a valve assembly for a wall-mounted boiler comprising a quick-connect device according to the invention; and FIG. 10a shows, on a larger scale, the detail indicated by Xa in FIG. 10.

Figure 1:
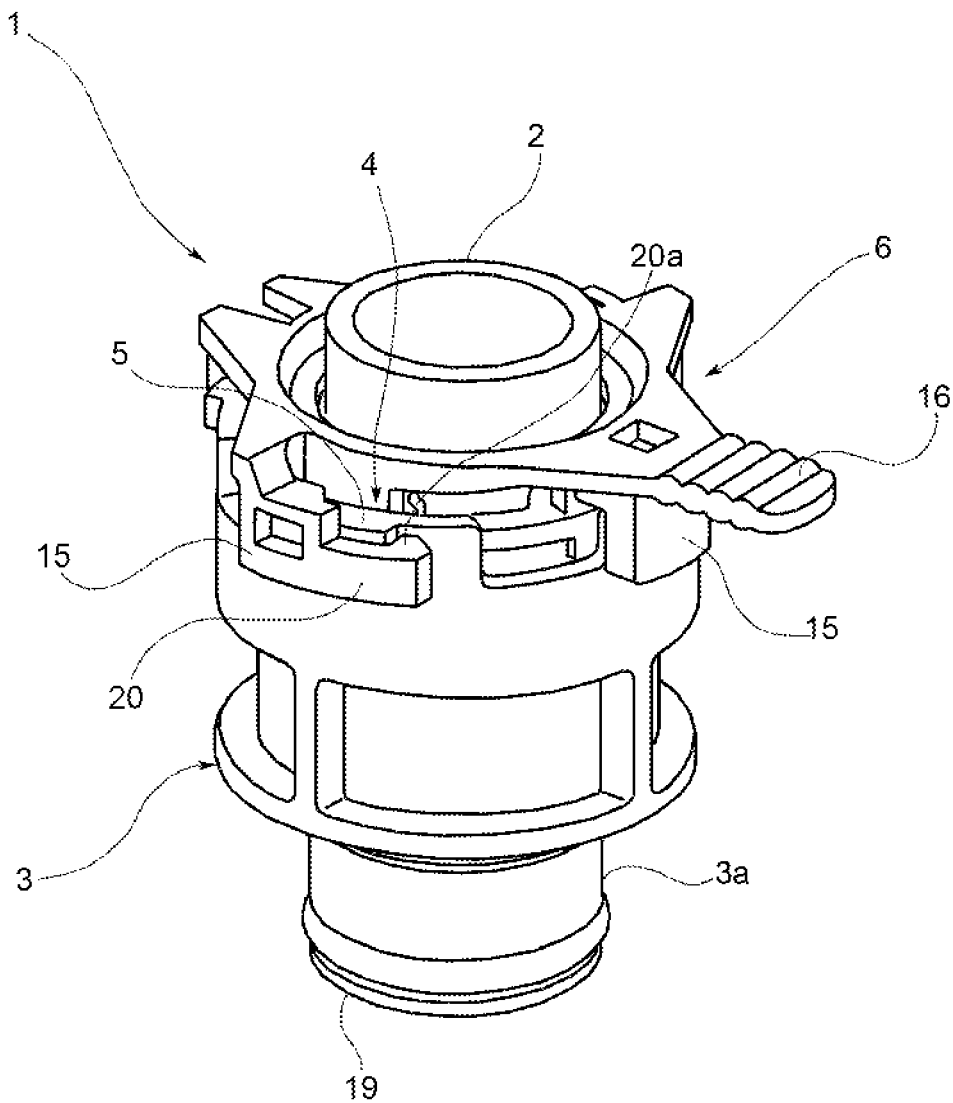
FIG. 1 is a perspective view of a quick-connect system according to the present invention, shown in the assembled condition.

In FIG. 1, 1 denotes in its entirety a quick-connect system or device for connecting a tube 2 to a receiving body (not shown in FIG. 1) such as a body of a valve assembly for a wall-mounted boiler or the like.

The tube 2 is conveniently made of plastic, with a multi-layered structure.

The quick-connect system or device 1 comprises a tubular interface formation 3, for example made of moulded plastic, which is fixed or able to be fixed to the receiving body, as will be illustrated further below. The receiving body may be the body of any hydraulic component forming part of, for example, a boiler, such as a valve assembly, a heat exchanger, etc.

Figure 2:
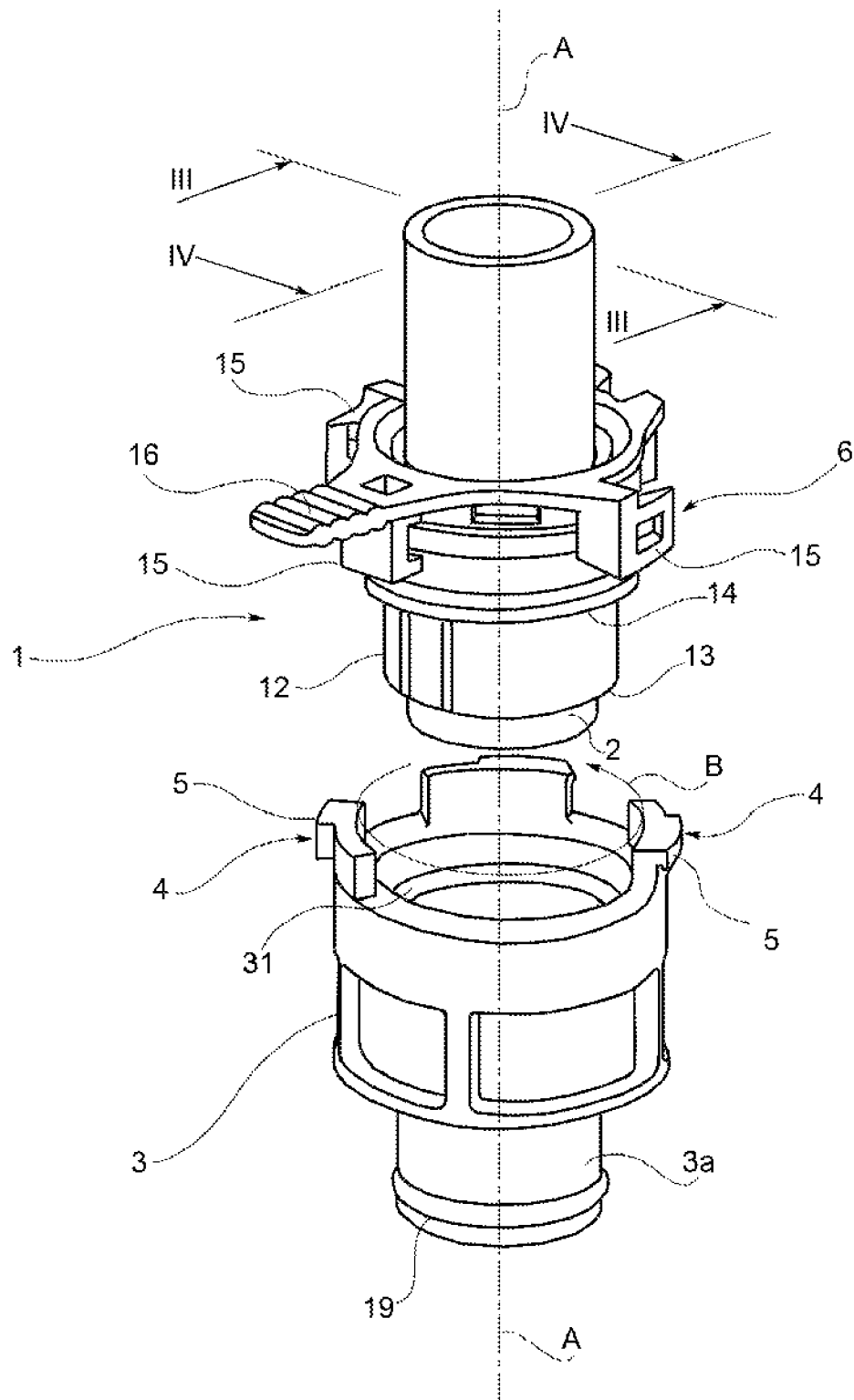
FIG. 2 is a partially exploded perspective view of the connecting system according to FIG. 1.
Figure 3:
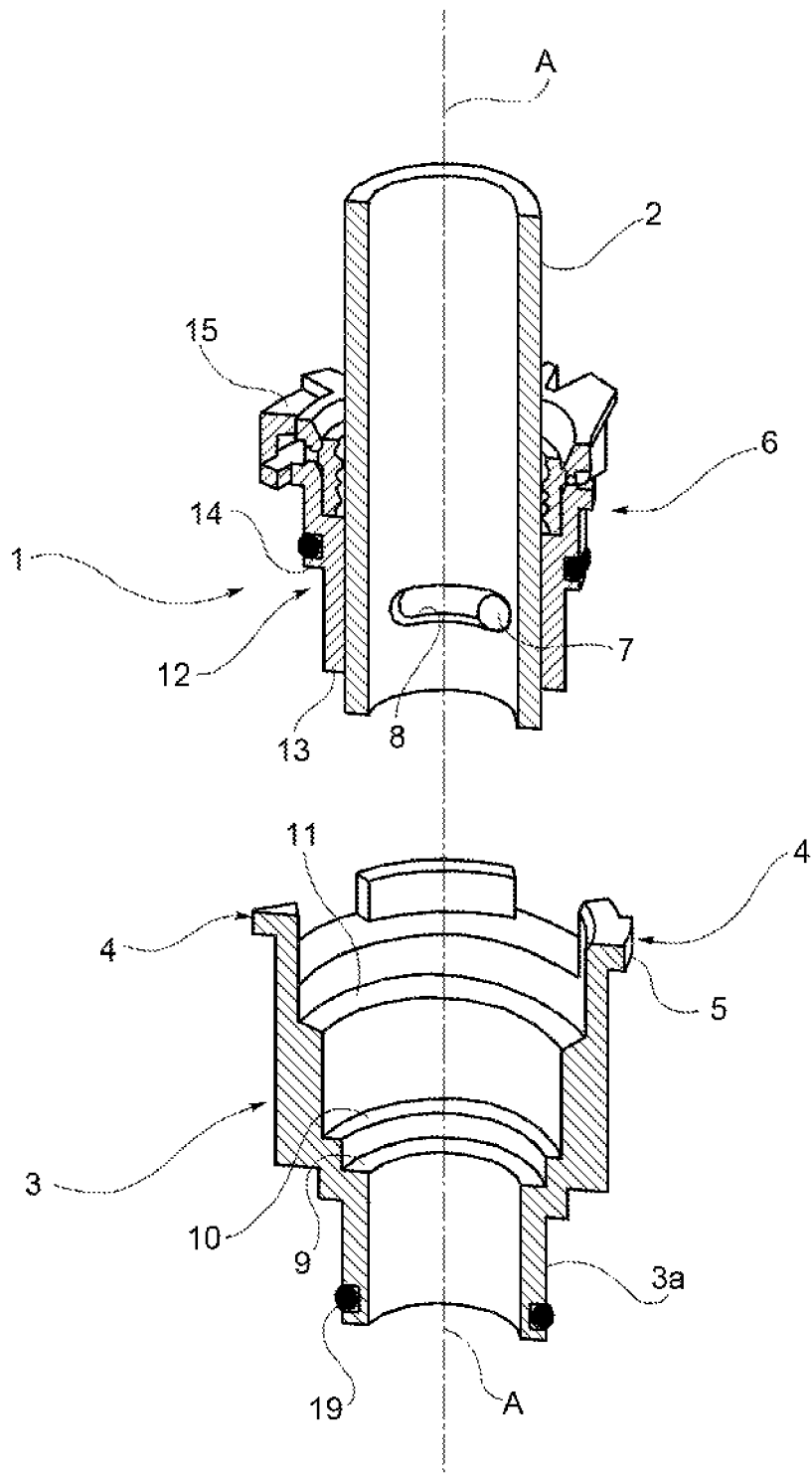
FIGS. 3 and 4 are cross-sectional views along the lines III-III and IV-IV of FIG. 2.

With reference for example to FIGS. 2 and 3, in the embodiment shown, the interface formation 3 has at the top a plurality of shaped retaining lugs 4 angularly spaced around its axis A-A and protruding axially and radially towards the outside.

With reference for example to FIG. 2, each of the retaining lugs 4 of the interface formation 3 comprises a curved projection 5 radially protruding towards the outside by an amount increasing in a predetermined angular sense or direction, in particular the direction indicated by the curved arrow B.

The quick-connect device 1 also comprises a fastening member, denoted overall by 6.

The fastening member 6 has a substantially tubular general shape. The tube 2 can be pre-inserted axially inside it, as can be seen for example in FIGS. 2 and 3.

Figure 7:
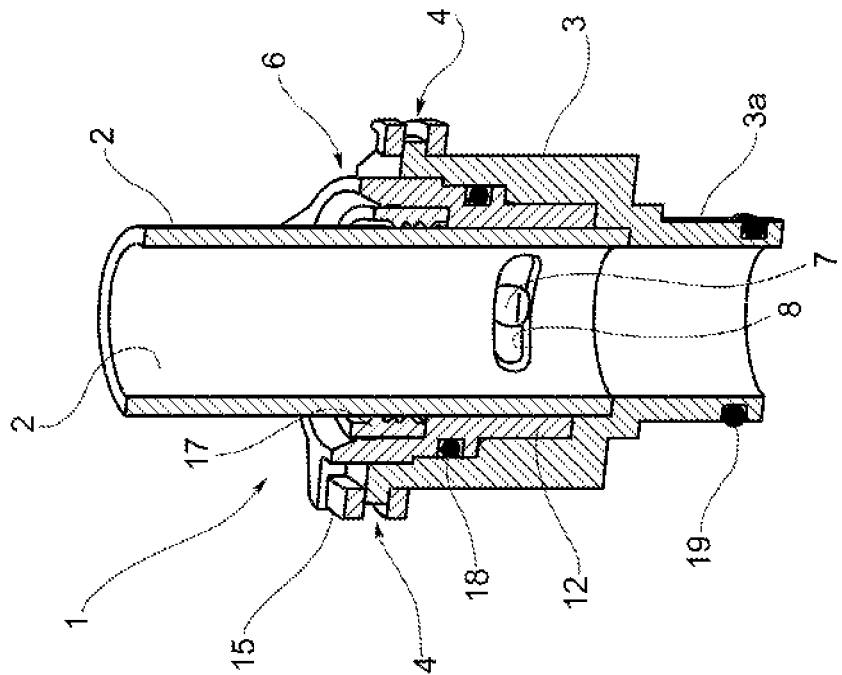
FIG. 7 is another perspective view of the connecting system according to the preceding figures, shown in the condition where the fastening member is locked together with the interface formation.

With reference in particular to FIGS. 3, 5 and 7, the fastening member 6 has at least one positioning projection 7 capable of engaging inside a corresponding eyelet 8 provided in the tube 2, when this tube is inserted (with slight interference) through the fastening member 6. The arrangement is such that, when the projection 7 is engaged inside the eyelet 8 of the tube 2, the latter and the fastening member 6 are substantially locked together axially, while being able to perform a relative angular displacement, about their axis, this displacement being of a predetermined amount, depending on the length of the eyelet 8.

Figure 4:
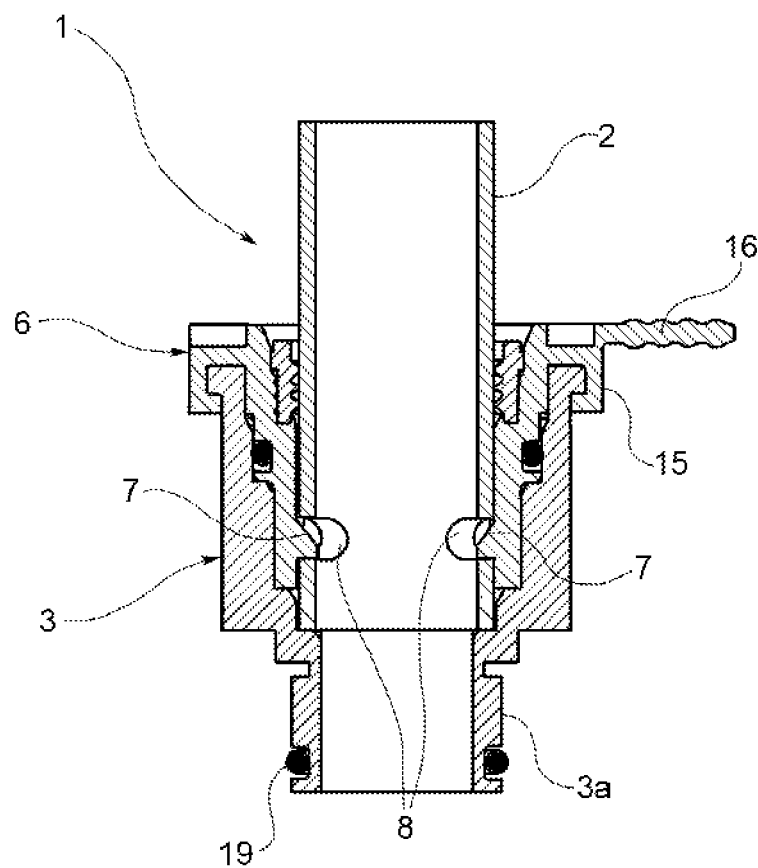

Preferably, as can be seen in FIG. 4, the fastening member 6 has two (or more) projections 7 which can be engaged inside corresponding eyelets 8 of the tube 2.

In any case, it should be noted that the portion of the fastening member 6 with the projections 7 is surrounded by the wall of the interface formation 3, which prevents disengagement of the projection(s) 7 from the eyelets 8 (and therefore the tube 2 from the member 6) owing to the pressure present in the plant or boiler in which the device 1 is used.

With reference to FIG. 3, in the example of embodiment shown, the interface formation 3 has internally a surface with a stepped profile which defines three annular shoulders or abutment surfaces denoted by 9 to 11.

The fastening member 6 has an essentially tubular main body 12 with a shape substantially matching the portion of the cavity of the interface 3 situated above the annular shoulder 10.

As can be seen for example in FIG. 3, the main body 12 of the locking member 6 has a bottom, terminal, annular surface 13 and an annular surface 14 situated above, these surfaces being intended to abut against the shoulders 10 and 11 of the interface formation 3 when the fastening member 6 is introduced fully inside the latter (FIG. 6).

In the condition where the fastening member 6, together with the tube 2 pre-mounted inside it, is inserted and positioned in the interface formation 3 (FIG. 6), the bottom end of the tube 2 abuts against the stop shoulder 9 of this formation 3.

The top end of the main body 12 of the fastening member 6 forms a plurality of projections protruding radially towards the outside and denoted by 15 in the drawings. These projections are angularly spaced around the axis A-A of the fastening member 6.

Each projection 15 of the member 6 forms an external peripheral coupling element able to engage, in a mutually axially retaining relationship, with the projection 5 of a corresponding retaining lug 4 of the interface formation 3. In the example shown, each coupling element 15 of the fastening member 6 has a cross-section substantially in the form of a square C able to embrace and slide radially on the outside of the curved projection 5 of the corresponding retaining lug 4 of the interface formation 3.

The arrangement is such that the fastening member 6, together with the tube 2 pre-inserted inside it, can in turn be inserted in the interface formation 3 in a relative angular position in which the coupling elements 15 are axially aligned and angularly alternate with the retaining lugs 4, 5 of the interface formation 3, as can be seen in particular in FIG. 5.

Figure 8:
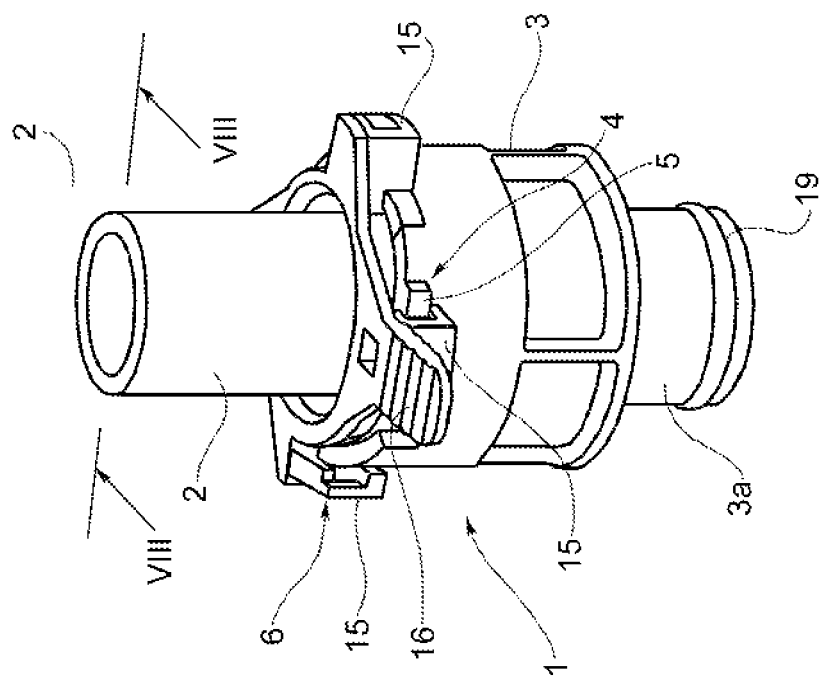
FIG. 8 is a cross-sectional view along the line VIII-VIII of FIG. 7.

The fastening member 6 can then be rotated in the predetermined direction indicated by the arrow B of FIG. 2, from the coupling position into a locked position, shown in FIGS. 7 and 8, so as to cause the engagement of each of its coupling elements 15 with the projection 5 of the corresponding retaining lug 4 of the interface formation 3.

The relative rotation of the fastening member 6 relative to the interface formation 3 may be easily performed owing to the fact that the fastening member 6 is conveniently provided with a transverse protruding formation 16 which facilitates manual operation thereof.

With reference in particular to FIGS. 6 and 8, an annular sealing member 17, preferably of the lip type, conveniently pre-mounted in the member 6, is arranged between the external surface of the tube 2 and an internal surface of the main body 12 of the fastening member 6. Moreover, an additional annular sealing member 18, such as a so-called O-ring, is conveniently arranged between the fastening member and the interface formation 3, being pre-positioned in a corresponding seat or groove provided in the fastening member 6.

The sealing members 17 and 18 may be manufactured separately from the member 6 or may be overmoulded thereon.

In the embodiment shown by way of example, the interface formation 3 has a tubular lug 3a advantageously provided with an external torus-shaped sealing ring 19.

With reference to FIG. 1, at least one coupling element 15 of the fastening member 6 has a flexible, integral, circumferential lug 20 provided with a terminal retaining tooth 20a directed radially towards the axis of this fastening member. The retaining tooth 20a of the flexible lug 20 is able to engage, in a disengageable manner, with an end of the projection 5 of the corresponding retaining lug 4 of the interface formation 3, when the fastening member 6 is in the angular locking position, so as to prevent return rotation of the fastening member 6 relative to the interface formation 3 (FIG. 1).

Figure 9:
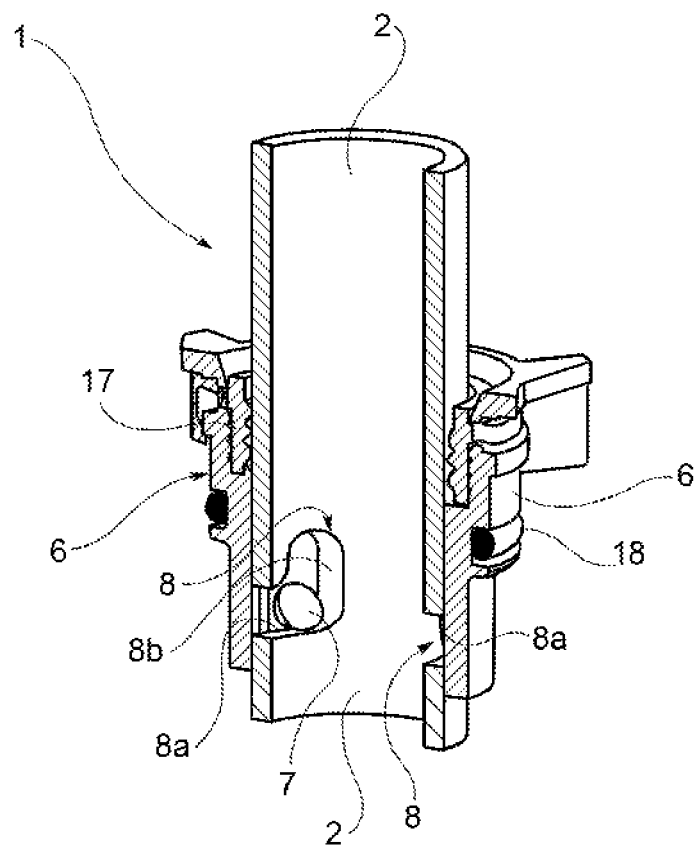
FIG. 9 is a partially sectioned view of a variation of embodiment.

FIG. 9 shows a variation of embodiment in which, in order to improve the manoeuvrability of the tube 2, it is allowed to perform a certain axial displacement relative to the fastening member 6, before said fastening member is locked on the interface formation 3. This axial displacement of the tube is permitted owing to the fact that the eyelet(s) 8 of this tube 2 are shaped essentially in the manner of an L with a vertical section or portion 8b and a horizontal section or portion 8a concentric with the axis of the tube 2. Once the fastening member 6 has been locked on the interface formation 3, the tube 2 is thus axially locked.

FIGS. 10 and 10a show a C-shaped body of a valve assembly for a wall-mounted boiler or the like, to which a tube 2 is connected by means of a quick-connect device or system 1 according to the present invention.

In the example of embodiment shown, the interface formation 3 may be formed integrally with the body of the valve device or may be formed separate and able to be stably connected to the body of this assembly.

Obviously, without affecting the principle of the invention, the embodiments and the constructional details may be significantly varied with respect to that described and illustrated purely by way of a non-limiting example, without thereby departing from the scope of the invention as defined in the accompanying claims.

The invention claimed is:

1. Quick-connect system for connecting a tube (2) to a receiving body (C), comprising:
   a tubular interface formation (3) fixed or able to be fixed to the receiving body (C) and having a plurality of shaped retaining lugs (4) angularly spaced around its axis (A-A) and protruding axially and radially towards the outside;
   a fastening member (6), with a substantially tubular shape, in which the tube (2) can be pre-inserted axially and which has a plurality of external peripheral coupling elements (15) angularly spaced around its axis (A-A) and each able to engage with a corresponding retaining lug (4) of the interface formation (3), in a mutually axially retaining relationship;
   the system (1) being such that
   the fastening member (6), with the tube (2) pre-inserted therein, is able to be inserted into the interface formation (3) in a relative coupling position in which the coupling elements (15) of the fastening member (6) angularly alternate with the retaining lugs (4, 5) of the interface formation (3);
   the fastening member (6) being then rotatable in a predetermined direction (B), around the tube (2) and with respect to the interface formation (3), from the aforementioned relative coupling position into a relative locking position, to achieve the engagement of each of its coupling elements (15) with a corresponding retaining lug (4, 5) of the interface formation (3),
   wherein the interface formation (3) has at least two internal stop surface (9-11) against which the tube (2) and the fastening member (6) axially abut, wherein a first annular sealing member (17) is arranged between the external surface of the tube (2) and an internal surface of the fastening member (6), and a second annular sealing member (18) is arranged between the fastening member (6) and the interface formation (3), said sealing members (17, 18) being mounted or overmoulded onto the fastening member (6), and wherein each of the retaining lugs (4) of the interface formation (3) has a curved projection (5) radially protruding towards the outside, and the corresponding coupling element (15) of the fastening member (6) has an element with an essentially C-shaped radial cross-section convex towards the outside, able to slide radially on the outside around the curved projection (5) of the corresponding retaining lug (4) of the interface formation (3).

2. Quick-connect system according to claim 1, wherein the fastening member (6) is internally provided with at least one positioning projection (7) able to engage in a corresponding eyelet (8) provided in the tube (2), such that when said projection (7) is engaged in the eyelet (8), the tube (2) and the fastening member (6) are capable of performing a relative angular displacement of a predetermined amount about their axis (A-A).

3. Quick-connect system according to claim 2, wherein the at least one eyelet (8) of the tube (2) has a portion (8a) which extends substantially along an arc of a circle which is concentric with the axis of the tube (2) and optionally also a further portion (8b) which extends along a direction having a component which is parallel to the axis of the tube (2) so as to allow an axial displacement of the tube (2) relative to the fastening member (6) for as long as the latter is not locked on the interface formation (3).

4. Quick-connect system according to claim 1, wherein the curved projections (5) of the retaining lugs (4) of the interface formation (3) protrude radially by an amount increasing in a predetermined angular sense or direction (B).

5. Quick-connect system according to claim 1, wherein at least one coupling element (15) of the fastening member (6) has a flexible circumferential lug (20) provided with a retaining tooth (20a) directed radially towards the axis (A-A) of the fastening member (6) and able to engage in a disengageable manner with one end of the projection (5) of the corresponding retaining lug (4) of the interface formation (3) so as to prevent a return rotation of the fastening member (6) relative to the interface formation (3).

6. Quick-connect system according to claim 1, wherein the fastening member (6) has at least one transverse protruding formation (16) which can be manually operated so as to rotate said member (6) relative to the interface formation (3).

7. Quick-connect system according to claim 1, wherein the tube (2) is a tube with a multi-layered structure, made of plastic, and the fastening member (6) is made of plastic.

* * * * *